(12) United States Patent
Usaka et al.

(10) Patent No.: US 8,318,822 B2
(45) Date of Patent: Nov. 27, 2012

(54) VIBRATION DAMPING AND SOUND ABSORBING MATERIAL AND PRODUCTION PROCESS THEREOF

(75) Inventors: Kazuto Usaka, Chiba (JP); Kouichi Sano, Ichihara (JP); Hiroyuki Utsumi, Bangkok (TH)

(73) Assignee: Mitsui Chemicals, Inc., Tokyo (JP)

( * ) Notice: Subject to any disclaimer, the term of this patent is extended or adjusted under 35 U.S.C. 154(b) by 474 days.

(21) Appl. No.: 12/450,975

(22) PCT Filed: Apr. 21, 2008

(86) PCT No.: PCT/JP2008/057708
§ 371 (c)(1), (2), (4) Date: Oct. 20, 2009

(87) PCT Pub. No.: WO2008/136300
PCT Pub. Date: Nov. 13, 2008

(65) Prior Publication Data
US 2010/0130633 A1 May 27, 2010

(30) Foreign Application Priority Data
Apr. 27, 2007 (JP) ................. 2007-118889

(51) Int. Cl.
*C08G 18/28* (2006.01)
(52) U.S. Cl. ........ 521/137; 521/130; 521/157; 521/172; 521/173; 521/174
(58) Field of Classification Search ........... 521/130, 521/137, 157, 172, 173, 174
See application file for complete search history.

(56) References Cited

U.S. PATENT DOCUMENTS

| 2,787,601 A | 4/1957 | Detrick et al. |
| 4,609,682 A | 9/1986 | Weber et al. |
| 2009/0143495 A1* | 6/2009 | Nozawa et al. ............. 521/157 |

FOREIGN PATENT DOCUMENTS

| JP | 61-91216 | 5/1986 |
| JP | 5-59144 | 3/1993 |
| JP | 11-166155 | 6/1999 |
| JP | 2005-320431 | 11/2005 |
| JP | 2005-320437 | 11/2005 |
| JP | 2006-2145 | 1/2006 |
| JP | 2006-104404 A | 4/2006 |
| WO | WO 2005/078000 A1 | 8/2005 |
| WO | WO 2007/020904 A1 | 2/2007 |
| WO | WO 2007/020905 A1 | 2/2007 |

OTHER PUBLICATIONS

International Search Report received in Jul. 15, 2008 for International Application No. PCT/JP2008/057708 (2 pgs).

* cited by examiner

*Primary Examiner* — John Cooney
(74) *Attorney, Agent, or Firm* — Foley & Lardner LLP

(57) ABSTRACT

It is an object of the invention to provide a vibration damping and sound absorbing material containing a plant-derived polyol which material largely contributes a decrease of environmental load and has excellent vibration damping and sound absorbing properties, and it is another object of the invention to provide a production process of the material. Specifically, disclosed is a vibration damping and sound absorbing material which is suitably used for cars. A vibration damping and sound absorbing material comprises a polyurethane foam which comprises, as raw materials, a polyol and/or a polymer-dispersed polyol in which polymer fine particles obtainable by polymerizing an unsaturated bond-containing compound are dispersed in a polyol, and water, a catalyst and a polyisocyanate, wherein the polyol comprises (A) a plant-derived polyol produced using a raw material obtainable by a plant.

4 Claims, No Drawings

VIBRATION DAMPING AND SOUND ABSORBING MATERIAL AND PRODUCTION PROCESS THEREOF

TECHNICAL FIELD

The present invention relates to a vibration damping and sound absorbing material containing a plant-derived polyol, and a production process thereof. Specifically, it relates to a vibration damping and sound absorbing material containing a plant component, which material can reduce environmental load and is suitable for vibration damping and sound absorbing materials used for cars and wallboards.

TECHNICAL BACKGROUND

Recently, plant-derived resins obtainable from plant resources have been noticed as an alternative for petroleum derived resins obtainable from petroleum resources as a raw material in viewpoint of decreasing environmental load. The plant-derived resins comprise raw materials obtainable from plants that are grown by photosynthesis while taking in $CO_2$ in the air. Therefore, even if $CO_2$ is exhausted by combustion treatment after use into the air, the amount of $CO_2$ in the air is not increased in consequence. The plant-derived resins are so-called materials which correspond to carbon neutral and contribute a decrease of environmental load.

Soft polyurethane foams have been widely used as a cushioning material, and recently, they are used as a sound absorbing material used in the fields of cars and the like. However, as conventional polyurethane foams are formed from components derived from petroleum all, the development for the polyurethane foams taking into consideration the environment, for example depression of exhaustion of petroleum resources and decrease of $CO_2$ exhausted, has been demanded.

As typical examples of polyol components used as a raw material for polyurethane foams, polyether polyol and polyester polyol derived from petroleum are known. Furthermore, it is known to use plant-derived castor oil, castor oil type polyols which are castor oil derivatives, or soybean oil type polyols which are soybean oil derivatives. For example, Patent document 1 discloses that aromatic diisocyanate is allowed to react with castor oil to form a prepolymer, and the prepolymer is allowed to react with water to form a polyurethane foam, and Patent document 2 discloses a process for producing a polyurethane foam by using a castor oil derivative such as hydrogenated castor oil or the like as an additive. Meanwhile, Patent document 3 discloses that an ester group-containing condensate (average molecular weight: 900 to 4500) prepared from recinoleic acid which is a main component of castor oil aliphatic acid, and mono- or more-hydric alcohol is used as an internal mold release agent in producing finely porous soft polyurethane molded articles, and Patent Document 4 discloses that a polyester polyol is used as a component of a urethane coating composition wherein the polyester polyol comprises a carboxylic acid unit (A) containing at least a part of dimer or more oxy carboxylic acid oligomer unit (a) prepared by condensation of carboxylic acids of castor oil aliphatic acid or the like, and a polyhydric alcohol unit (B). Moreover, Patent Document 5 discloses that a polyurethane foam for automobile seats is prepared by adding at least one molecule of alkylene oxide to a plant fat and oil such as castor oil or its derivative, and allowing a polyol having a hydroxyethyl group at the molecule chain end to react with an isocyanate compound. Patent Document 6 discloses that a soft polyurethane foam prepared from a polyisocyanate compound and a polyol obtainable by adding ethylene oxide/propylene oxide to an epoxidized soybean oil which is ring opened by alcohol is used as a cushioning material for automobile seats. Patent Document 7 discloses that a polyurethane foam is produced by using a polyester polyol having a specific polyol component structure as a composition for preparing a polyurethane foam having proper hardness and impact resilience as a cushioning material and also by determining the NCO index to a specific value, and further discloses that a plant fat and oil such as castor oil aliphatic acid or the like is preferably used as a raw material for a polyester polyol. Patent Document 8 discloses that, as a cushioning material for car seat cushioning or the like, a plat derived polyurethane foam composition is preferably used for preparing a polyurethane foam having good balance between proper hardness, impact resilience and durability. Patent Document 9 discloses that a plant-derived polyurethane foam having excellent low impact properties, which is suitable for impact absorbing materials, sound absorbing materials and vibration damping materials, is obtainable from a polyurethane foam composition.

However, the polyurethane foam described in Patent Document 1 is a hard polyurethane foam, and therefore a soft polyurethane foam having proper characteristics as a vibration damping and sound absorbing material is not obtained. In the process of Patent Document 2, a castor oil type polyol is used as an additive and the addition amount thereof is from 0.1 to 15% by weight based on the polyhydroxy compound. Particularly, in the example, castor oil type polyol is used in a slight amount of 5% based on all polyol components, and the effect merely shows on curing properties and low compression permanent set. Furthermore, in Patent Documents 3 and 4, polyols having a higher molecular weight as compared with the castor oil type polyol used in Patent Document 1 or 2 are used. In Patent Document 3, this polyol is merely used as an internal mold release agent. In Patent Document 4, the coating composition is merely disclosed. Patent Documents 5, 6, 7 and 8 each disclose the polyurethane foam for automobile seats as the use with general expression, and do not disclose sound absorbing properties. In Patent Document 9, the use includes cushioning materials and mattresses having excellent low impact properties, therefore vibration damping and sound absorbing materials formed from polyurethane foams having vibration damping and sound absorbing properties cannot be obtained.

That is to say, vibration damping and sound absorbing materials containing a plant-derived polyol and having excellent vibration damping and sound absorbing properties cannot be obtained by the processes disclosed in these patent documents.

Patent Document 1: Specification in U.S. Pat. No. 2,787,601
Patent Document 2: JP-A-H5-59144
Patent Document 3: JP-A-S61-91216
Patent Document 4: JP-A-H11-166155
Patent Document 5: JP-A-2005-320437
Patent Document 6: JP-A-2005-320431
Patent Document 7: JP-A-2006-2145
Patent Document 8: WO-2007/020904 A1
Patent Document 9: WO-2007/020905 A1

DISCLOSURE OF THE INVENTION

Object of the Invention

It is an object of the invention to provide a vibration damping and sound absorbing material containing a plant-derived polyol which material largely contributes a decrease of environmental load and has excellent vibration damping and sound absorbing properties, and it is another object of the invention to provide a production process of the material.

Means for Solving the Subject

The present inventors have been earnestly studied for solving the above subjects, and found that a vibration damping and sound absorbing material containing a plant-derived polyol, capable of contributing a decrease of environmental load and having excellent vibration damping and sound absorbing properties can be prepared by producing a vibration damping and sound absorbing material formed from a soft polyurethane foam which is obtainable utilizing a plant-derived polyol effectively. Thus, the present invention has been accomplished.

That is, the vibration damping and sound absorbing material of the present invention comprises a polyurethane foam which comprises, as raw materials, a polyol and/or a polymer-dispersed polyol in which polymer fine particles obtainable by polymerizing an unsaturated bond-containing compound are dispersed in a polyol, and further water, a catalyst and a polyisocyanate, wherein the polyol comprises (A) a plant-derived polyol produced using a raw material obtainable by a plant.

The plant-derived polyol (A), which is not particularly limited, is preferably castor oil and/or a derivative thereof, or a soybean derivative.

The plant-derived polyol (A) preferably comprises at least one plant-derived polyol selected from the group consisting of:

(A1) a plant-derived polyester polyol at least having a structure such that a hydroxycarboxylic acid having 15 or more carbon atoms obtainable from a plant oil is condensed in a polyhydric alcohol having 2 to 6 hydroxyl groups in one molecule, (A2) a polyol obtainable by, further, adding lactone to the plant-derived polyester polyol (A1), and (A3) a polyol obtainable by, further, adding a hydroxy carboxylic acid having a primary hydroxyl group to the plant-derived polyester polyol (A1).

The condensation molar number of a hydroxycarboxylic acid having 15 or more carbon atoms is preferably from 1 to 15 mol, more preferably 1 to 10 mol, per 1 mol of a polyhydric alcohol having 2 to 6 hydroxyl groups in one molecule.

The plant-derived polyol (A) preferably comprises at least one plant-derived polyol selected from the group consisting of:

(A4) a plant-derived polyester polyol at least having a structure such that a hydroxycarboxylic acid, which comprises a castor oil aliphatic acid containing, as a main component, recinoleic acid obtainable from castor oil and/or a hydrogenated castor oil aliphatic acid containing, as a main component, 12-hydroxystearic acid obtainable by saturating carbon-carbon double bond in the castor oil aliphatic acid, is condensed in a polyhydric alcohol having 2 to 6 hydroxyl groups in one molecule, (A5) a polyol obtainable by, further, adding lactone to the plant-derived polyester polyol (A4), and (A6) a polyol obtainable by, further, adding a hydroxy carboxylic acid having a primary hydroxyl group to the plant-derived polyester polyol (A4).

The gas permeability of the vibration damping and sound absorbing material containing the plant-derived polyol is preferably from 5 to 60 cc/cm$^2$·sec, and more preferably 10 to 40 cc/cm$^2$·sec.

The test piece having a thickness of 20 mm obtainable by the vibration damping and sound absorbing material has a maximum sound absorbing coefficient, as measured in accordance with 2 microphone method by ISO10534-2, of preferably at least 0.70, more preferably at least 0.80, most preferably at least 0.90.

The vibration damping and sound absorbing material is used for preferably cars and wallboards, and particularly preferably car dash silencers, floor mats, and interior materials such as ceiling materials.

The process for producing a vibration damping and sound absorbing material formed from a polyurethane foam according to the present invention comprises:

injecting a mixed solution which comprises a polyol and/or a polymer-dispersed polyol in which polymer fine particles obtainable by polymerizing a compound having an unsaturated bond in the polyol are dispersed, water, a catalyst and a polyisocyanate, into a mold, reacting, expanding and curing, and then releasing from the mold, wherein the polyol comprises (A) a plant-derived polyol obtainable by using a raw material prepared from a plant.

The mixed solution may be prepared by:

[1] preparing a resin premix by mixing a polyol and/or a polymer-dispersed polyol in which polymer fine particles obtainable by polymerizing a compound having an unsaturated bond in the polyol are dispersed, and further water and a catalyst, and

[2] mixing the resin premix prepared in the step [1] with a polyisocyanate.

The plant-derived polyol (A) preferably comprises at least one plant-derived polyol selected from the group consisting of:

(A1) the plant-derived polyester polyol at least having a structure such that a hydroxycarboxylic acid having 15 or more carbon atoms obtainable from a plant oil is condensed in a polyhydric alcohol having 2 to 6 hydroxyl groups in one molecule, (A2) the polyol obtainable by, further, adding lactone to the plant-derived polyester polyol (A1), and (A3) the polyol obtainable by, further, adding a hydroxy carboxylic acid having a primary hydroxyl group to the plant-derived polyester polyol (A1).

The plant-derived polyol (A) also preferably comprises at least one plant-derived polyol selected from the group consisting of:

(A4) the plant-derived polyester polyol at least having a structure such that a hydroxycarboxylic acid, which comprises a castor oil aliphatic acid containing, as a main component, recinoleic acid obtainable from castor oil, and/or a hydrogenated castor oil aliphatic acid containing, as a main component, 12-hydroxystearic acid obtainable by saturating carbon-carbon double bond in the castor oil aliphatic acid, is condensed in a polyhydric alcohol having 2 to 6 hydroxyl groups in one molecule, (A5) the polyol obtainable by, further, adding lactone to the plant-derived polyester polyol (A4), and (A6) the polyol obtainable by, further, adding a hydroxy carboxylic acid having a primary hydroxyl group to the plant-derived polyester polyol (A4).

Effect of the Invention

Since the vibration damping and sound absorbing material containing a plant-derived polyol has excellent vibration damping and sound absorbing properties, it is used for preferably cars and wallboards, particularly preferably dash silencers, floor mats, and interior materials such as ceiling materials. Moreover, because of using the plant-derived polyol, it can greatly contribute a decrease of environmental load corresponding to the social order of the day toward global environmental preservation.

BEST MODE FOR CARRYING OUT THE INVENTION

[Vibration Damping and Sound Absorbing Material]

The vibration damping and sound absorbing material according to the present invention comprises a polyurethane foam which comprises, as raw materials, a polyol and/or a polymer-dispersed polyol in which polymer fine particles obtainable by polymerizing a compound containing an unsaturated bond in a polyol, and further water, a catalyst and a polyisocyanate, and the polyol comprises (A) the plant-derived polyol produced using a raw material obtainable by a plant.

Since the vibration damping and sound absorbing material of the present invention can have excellent properties for cars and wallboards, particularly cars and also is prepared using a plant-derived material, it can greatly contribute a decrease of environmental load corresponding to the social order of the day toward global environmental preservation. Examples of the use for cars may include car dash silencers, and car interior materials such as, floor mats, ceiling materials and the like.

The vibration damping and sound absorbing material of the present invention can be used in a two-layer structure or a multi-layer structure by combining with a high specific gravity surface material (vinyl chloride resin, olefin resin or the like). Examples of the two-layer structure may include vibration damping and sound absorbing material/surface material, or surface material/vibration damping and sound absorbing material. Examples of the multi-layer structure may include surface material/vibration damping and sound absorbing material/surface material, and the like.

(Polyol)

The raw materials for producing the vibration damping and sound absorbing material of the present invention comprise a polyol and/or a polymer-dispersed polyol in which polymer fine particles obtainable by polymerizing a compound having an unsaturated bond, in the polyol, and the polyol comprises the plant-derived polyol (A) produced by using a raw material prepared from a plant.

<(A) Plant-Derived Polyol>

The plant-derived polyol (A) used in the present invention is a polyol prepared by using a raw material prepared from a plant. Examples of the plant-derived polyol may include castor oil, a derivative thereof and a soybean derivative. These plant-derived polyols may be used singly, or two or more of them may be combined for use.

Examples of castor oil and a derivative thereof may include castor oil, hydrogenated castor oil, a polyester polyol prepared from castor oil aliphatic acid condensate, a polyester polyol prepared from a hydrogenated castor oil aliphatic acid condensate, and a mixture thereof.

Examples of the soybean derivative may include hydroxylated soybean oil, and a polyester polyol prepared from a hydroxylated soybean oil and fat condensate.

Preferable examples of the plant-derived polyol (A) may include the following plant-derived polyester polyols (A1) to (A6).

(Plant-Derived Polyester Polyol (A1))

The plant-derived polyester polyol (A1) is a polyester polyol having a structure such that a hydroxy carboxylic acid having 15 or more carbon atoms obtainable from a plant oil such as castor oil, soybean oil and the like is condensed in an amount of preferably 1 to 15 mol, more preferably 1 to 10 mol based on 1 mol of a polyhydric alcohol having 2 to 6 hydroxyl groups in one molecule.

(Plant-Derived Polyester Polyol (A2))

The plant-derived polyester polyol (A2) is a polyol obtainable by adding lactone to the plant-derived polyester polyol (A1).

(Plant-Derived Polyester Polyol (A3))

The plant-derived polyester polyol (A3) is a polyol obtainable by adding a hydroxycarboxylic acid having a primary hydroxyl group to the plant-derived polyester polyol (A1).

(Plant-Derived Polyester Polyol (A4))

The plant-derived polyester polyol (A4) is a polyester polyol having a structure such that a castor oil aliphatic acid containing, as a main component, a ricinoleic acid obtainable from castor oil and/or a hydroxycarboxylic acid containing hydrogenated castor oil aliphatic acid containing, as a main component, 12-hydroxystearic acid obtainable by saturating a carbon-carbon double bond in the castor oil aliphatic acid are condensed in amounts of preferably 1 to 15 mol, more preferably 1 to 10 mol, per 1 mol of polyhydric alcohol having 2 to 6 hydroxyl groups in one molecule. It is unfavorable that the amounts of the castor oil aliphatic acid and/or the hydroxycarboxylic acid are over 15 mol, because the expanding action of a urethane foam obtained is apt to be unstable.

(Plant-Derived Polyester Polyol (A5))

The plant-derived polyester polyol (A5) is a polyol obtainable by adding lactone to the plant-derived polyester polyol (A4).

(Plant-Derived Polyester Polyol (A6))

The plant-derived polyester polyol (A4) is a polyol obtainable by adding a hydroxycarboxylic acid having a primary hydroxyl group to the plant-derived polyester polyol (A4).

These plant-derived polyester polyols may be used singly, or two or more of them may be combined for use.

Using the plant-derived polyester polyol having the condensed proportion of a hydroxycarboxylic acid having 15 or more carbon atoms in the above range per polyhydric alcohol, a vibration damping and sound absorbing material formed from a polyurethane foam having excellent sound absorbing properties can be formed.

Furthermore, it is possible to also use a polyol having a structure such that a hydroxycarboxylic acid having 15 or more carbon atoms is condensed to an oil and fat having a hydroxyl group such as castor oil and the like.

Among the above polyhydric alcohols, examples of the polyhydric alcohol having 2 to 6 hydroxyl groups in one molecule are dihydric alcohols having 2 to 10 carbon atoms such as ethylene glycol, propylene glycol, diethylene glycol, dipropylene glycol, 1,3-propane diol, 1,3-butane diol, 1,4-butane diol, 1,6-hexane diol and 1,4-cyclohexane diol; trihydric alcohols having 2 to 10 carbon atoms such as trimethylol propane and glycerin; tetrahydric alcohols such as diglycerin, pentaerythritol and α-methyl glucoside; hexahydric alcohols such as dipentaerythritol and the like; sugars such as glucose, sorbitol and fructose, and derivatives thereof; and phenols having 2 to 6 hydroxyl groups such as bisphenol A. Examples of the polyhydric alcohols having 7 or more hydroxyl groups in one molecule are sugars such as sucrose and the like, and derivatives thereof; and phenols having 7 or more hydroxyl groups. Furthermore, it is possible to use alkylene oxide adducts of polyhydric alcohols obtainable by adding ethylene oxide or propylene oxide to these polyhydric alcohols. These polyhydric alcohols can be used singly, or two or more of them can be mixed for use.

Since in the case of using the polyhydric alcohols having 2 to 10 hydroxyl groups in one molecule, a vibration damping and sound absorbing material having a minute cell structure can be prepared, the maximum sound absorbing coefficient determined by sound absorbing coefficient measurement described later becomes a high value and a vibration damping and sound absorbing material having excellent sound absorbing properties can be prepared. On this account, it can be favorably used to vibration damping and sound absorbing materials for cars and wallboards, particularly, car dash silencers, and car interior materials such as floor mats, ceiling materials and the like.

As the hydroxyl carboxylic acid having 15 or more carbon atoms obtainable from the above plant oils, saturated or unsaturated aliphatic acids having a hydroxyl group or hydrogenation products of the unsaturated aliphatic acid are preferably used, and among them, aliphatic acids having 15 to 20 carbon atoms are preferably used. Moreover, of these, saturated or unsaturated aliphatic acid having a hydroxyl group taken from natural oils and fats such as castor oil, *Dimorphotheca* oil, *Lesquerella* oil and *Lesquerella densipila* seed oil, and hydrogenation products of the unsaturated aliphatic acids are preferable, and particularly, aliphatic acids containing, as a main component, ricinolic acid and 12-hydroxystearic acid are preferable. Furthermore, it is also possible to use aliphatic acid obtainable by hydroxylating an unsaturated aliphatic acid having no hydroxyl group such as oleic acid and linolenic acid, taken from soybean oil, olive oil, rice bran oil and palm oil, and a hydroxylated plant oil aliphatic acid such as hydroxylated soybean oil aliphatic acid and the like, taken after hydroxylation of soybean oil.

In the case that the above hydroxycarboxylic acid is condensed with the above polyhydric alcohol, after condensing the hydroxy carboxylic acid, the resulting polycondensed product may be condensed with the polyhydric alcohol, or after condensing the polyhydric alcohol with the hydroxycarboxylic acid, the hydroxycarboxylic acid may be condensed.

Examples of the lactones are β-lactones such as β-propiolactone and the like; γ-lactones such as γ-butyrolactone and the like; δ-lactones such as δ-valerolactone and the like; and ε-lactones such as ε-caprolactone and the like. β-propiolactone and ε-caprolactone are preferable.

Examples of the hydroxycarboxylic acid having a primary hydroxyl group are ring opened products of the above lactones such as 3-hydroxypropionic acid and the like.

In addition to the above-described raw materials, raw materials obtainable from plants can be widely used for the plant-derived polyol (A). Examples thereof are glucoses obtainable from starches, and derivative thereof such as lactic acid, 3-hydroxypropionic acid, succinic acid, 1,4-butane diol, and their mixtures and derivatives. Further examples thereof are cellulose, hemicellulose, lignin and their derivatives, obtainable from wood, or sebacic acid that is a derivative of castor oil aliphatic acid, and its derivatives.

Moreover, as the plant-derived polyols (A), polyols obtainable by adding propylene oxide and/or ethylene oxide to the plant-derived polyester polyols (A1) to (A6) can be also used.

Additionally, as the plant-derived polyols (A), plant-derived prepolymers having a hydroxyl group at the end obtainable by reacting the plant-derived polyester polyols (A1) to (A6) with polyisocyanates can be also used. The polyisocyanates used in the prepolymers are not limited particularly. It is possible to preferably use conventionally known tolylenediisocyanates (the proportion of isomers such as 2,4-form to 2,6-form is not particularly limited, and further it is preferred to use tolylenediisocyanate having a proportion of 2,4-form and 2,6-form of 80/20), diphenylmethane diisocyanate, polymethylene polyphenyl polyisocyanate, and a mixture of tolylenediisocyanate and polymethylene polyphenyl polyisocyanate. It is further possible to preferably use urethane modified products and carbodiimide modified products of these polyisocyanates, and mixtures of these products and tolylenediisocyanate.

In the present invention, the plant-derived polyol (A) has an acid value of preferably less than 10 mgKOH/g, more preferably less than 8 mgKOH/g, especially less than 5 mg KOH/g. It is not favorable that the acid value is too high, because the reaction rate in urethane expanding is lowered significantly and thereby the productivity is also lowered.

The plant-derived polyol (A) has a hydroxyl group value of preferably from 30 to 200 mgKOH/g, more preferably 65 to 170 mgKOH/g.

When the hydroxyl group value is 65 to 170 mgKOH/g, the expanding action can be more stabilized and thus cells constituting a urethane foam can be densified. Therefore, a vibration damping and sound absorbing material having sufficiently low gas permeability can be prepared, and thereby the maximum sound absorbing coefficient as determined by measurement of the sound absorbing coefficient described later becomes a high value. Thus, a vibration damping and sound absorbing material having excellent sound absorbing properties can be prepared. Accordingly, it can be favorably used to vibration damping and sound absorbing materials for cars and wallboards, particularly, for car dash silencers, and car interior materials such as floor mats and ceiling materials.

The plant-derived polyols (A) can be used singly, or two or more thereof can be combined for use.

<Polyol>

The polyol may be a polyol usually used in production of polyurethane foams. Examples of the polyol are polyhydric alcohols such as dihydric to hexahydric ones, polyoxyalkylene polyol, polymer polyol obtainable from this polyoxyalkylene polyol, and polyester polyol. These polyols can be used singly, or two or more thereof can be combined for use.

Concerning dihydric to hexahydric polyhydric alcohols, examples of dihydric alcohols are ethylene glycol and propylene glycol, examples of trihydric alcohols are glycerin and trimethylol propane, examples of tetrahydric alcohols are pentaerythritol, diglycerin and α-methyl glucoside, and examples of hexahydric alcohols are sorbitol and the like.

Polyoxyalkylenepolyols are oligomers or polymers obtainable by open ring polymerizing alkylene oxides. They are generally obtainable by open ring polymerizing alkylene oxide in the presence of a catalyst using an active hydrogen compound as an initiator. The polyoxyalkylenepolyols are sometimes referred to polyoxyalkylene polyetherpolyols. The polyoxyalkylene polyols have a hydroxyl group value of preferably 16 to 120 mgKOH/g, more preferably 15 to 60 mgKOH/g. The polyoxyalkylene polyols can be used singly, or two or more of them can be used together.

The active hydrogen compound and the alkylene oxide used in the production of the polyoxyalkylenepolyols are described below.

(Active Hydrogen Compound)

In the polyoxyalkylene polyol production, examples of the active hydrogen compound used as the initiator may include an active hydrogen compound having an active hydrogen atom attached to an oxygen atom, and an active hydrogen compound having an active hydrogen atom attached to a nitrogen atom.

Examples of the active hydrogen compound having an active hydrogen atom attached to an oxygen atom may include water, carboxylic acids having 1 to 20 carbon atoms, polyhydric carboxylic acids having 2 to 6 carboxyl groups and having 2 to 20 carbon atoms and, carbamic acids, alcohols having 1 to 20 carbon atoms, polyhydric alcohols having 2 to 8 hydroxyl groups, sugars or their derivatives, aromatic compounds having 1 to 3 hydroxyl groups and having 6 to 20 carbon atoms, and polyalkylene oxides having 2 to 8 end groups which groups have 1 to 8 hydroxyl groups in total.

Examples of the carboxylic acids having 1 to 20 carbon atoms are formic acid, acetic acid, propionic acid, isobutylic acid, lauric acid, stearic acid, oleic acid, phenylacetic acid, dihydrocinnamic acid, cyclohexane carboxylic acid, benzoic acid, paramethyl benzoic acid and 2-carboxyhydronaphthalic acid. Examples of the polyhydric carboxylic acids having 2 to 6 carboxyl groups and having 2 to 20 carbon atoms are oxalic acid, malonic acid, succinic acid, maleic acid, fumaric acid, adipic acid, itaconic acid, butane tetracarboxylic acid, phthalic acid, isophthalic acid, terephthalic acid, trimellitic acid and pyromellitic acid.

Examples of the carbamic acids are N, N-diethyl carbamic acid, N-carboxy pyrrolidone, N-carboxy aniline and N,N'-dicarboxy-2,4-toluene diamine. Examples of the alcohols having 1 to 20 carbon atoms are methanol, ethanol, normal propanol, isopropanol, normal butyl alcohol, sec-butyl alcohol, tert-butyl alcohol, isopentyl alcohol, tert-pentyl alcohol, normal octyl alcohol, lauryl alcohol, cetyl alcohol, cyclopentanol, allyl alcohol, crotyl alcohol, methylvinyl carbinol, benzyl alcohol, 1-phenylethyl alcohol, triphenyl carbinol and cinnamyl alcohol.

Examples of the polyhydric alcohols having 2 to 8 hydroxyl groups and having 2 to 20 carbon atoms are ethylene glycol, diethylene glycol, dipropylene glycol, 1,3-butane diol, 1,4-butane diol, 1,6-hexane diol, 1,4-cyclohexane diol, trimethylol propane, glycerin, diglycerin, pentaerythritol and dipentaerythritol.

Examples of the sugars and their derivatives are α-methyl glucoside, glucose, sorbitol, dextrose, fructose and sucrose. Examples of the aromatic compounds having 1 to 3 hydroxyl groups and having 6 to 20 carbon atoms are phenol, 2-naphtol, 2,6-dihydroxy naphthalene and bisphenol A.

Examples of the polyalkylene oxides having 1 to 8 hydroxyl groups at the ends are polyethylene oxide, polypropylene oxide and their copolymers.

Among the active hydrogen compounds, examples of the active hydrogen compound having an active hydrogen atom attached to a nitrogen atom may include aliphatic or aromatic primary amines having 1 to 20 carbon atoms, aliphatic or aromatic secondary amines having 2 to 20 carbon atoms, polyhydric amines having 2 to 3 primary or secondary amines of 2 to 20 carbon atoms, saturated cyclic secondary amines having 4 to 20 carbon atoms, unsaturated cyclic secondary amines having 4 to 20 carbon atoms, un-substituted or N-substituted acid amides having 4 to 20 carbon atoms, 5 to 7-membered cyclic amides and imides of dicarboxylic acid having 4 to 10 carbon atoms.

Examples of the aliphatic or aromatic primary amines having to 20 carbon atoms are methylamine, ethylamine, normal propylamine, isopropylamine, normal butylamine, isobutylamine, sec-butylamine, tert-butylamine, cyclohexylamine, benzylamine, β-phenylethylamine, aniline, o-toluidine, m-toluidine and p-toluidine.

Examples of the aliphatic or aromatic secondary amines having 2 to 20 carbon atoms are dimethylamine, methylethylamine, diethylamine, dinormalpropylamine, ethylnormalbutylamine, methyl-sec-butylamine, dipentylamine, dicyclohexylamine, N-methylaniline and diphenylamine.

Examples of the polyhydric amines having 2 to 3 primary or secondary amines of 2 to 20 carbon atoms are ethylene diamine, di(2-aminoethyl)amine, hexamethylene diamine, 4,4-diaminodiphenylamine, tri(2-aminoethyl)amine, N,N'-dimethylethylenediamine, N,N'-diethylethylenediamine and di(2-methylaminoethyl)amine.

Examples of the saturated cyclic secondary amines having 4 to 20 carbon atoms are pyrrolidine, piperidine, morpholine and 1,2,3,4-tetrahydroquinoline. Examples of the unsaturated cyclic secondary amines having 4 to 20 carbon atoms are 3-pyrroline, pyrrole, indole, carbazole, imidazole, pyrrazole and purine.

Examples of the cyclic polyhydric amines having 2 to 3 secondary amino groups of 4 to 20 carbon atoms are piperadine, pyrazine and 1,4,7-triazacyclononane. Examples of the un-substituted or nitrogen-substituted acid amides having 2 to 20 carbon atoms are acetoamide, propione amide, N-methyl propione amide, N-methyl benzoic acid amide and N-ethyl stearic acid amide.

Examples of the 5 to 7-membered cyclic amides are 2-pyrolidone and ε-caprolactam. Examples of the imides of dicarboxylic acid having 4 to 10 carbon atoms are succinic acid imide, maleic acid imide and phthalic imide.

In the present invention, among these active hydrogen compounds, ethylene glycol, diethylene glycol, propylene glycol, dipropylene glycol, glycerin, diglycerin, trimethylol propane, pentaerythritol, α-methyl glucoside and sorbitol are preferred. Furthermore, propylene glycol, dipropylene glycol, glycerin, trimethylol propane, pentaerythritol, α-methyl glucoside and sorbitol are more preferred. Particularly, dipropylene glycol, glycerin and pentaerythritol are preferred. The initiators can be used singly, or two or more of them are used in combination.

(Alkylene Oxide Compound)

Examples of the alkylene oxide compound used in the preparation of the polyalkylene polyol are ethylene oxide, propylene oxide, 1,2-butylene oxide, 2,3-butylene oxide, styrene oxide, cyclohexene oxide, epichlorohydrin, epibromohydrin, methylglycidyl ether, allylglycidyl ether and phenylglycidyl ether.

Of these alkylene oxide compounds, ethylene oxide, propylene oxide, 1,2-butylene oxide and styrene oxide are preferred, and furthermore, ethylene oxide and propylene oxide are preferred. They can be used singly or two or more of them can be used in combination. When two or more alkylene oxide compounds are used in combination, they preferably contain ethylene oxide and the proportion of the ethylene oxide in the alkylene oxide compounds is preferably from 5 to 30% by mass.

<Polymer Dispersed Polyol>

The polymer dispersed polyol (sometimes referred to polymer polyol) used in the present invention is a dispersion of a vinyl polymer partly containing a grafted polymer (hereinafter, sometimes referred to polymer fine particles simply) obtainable by dispersion polymerizing an unsaturated bond-having compound such as acrylonitrile or styrene in a polyol using a radical initiator such as azobisisobutylonitrile or the like.

Although the above-described polyols can be employed as the polyol used herein, it is preferred to use a polyoxyalkylene polyol. The polymer prepared by the dispersion polymerization has an average particle diameter of preferably 0.1 to 10 micrometers. The polymer polyol used in the present invention usually has a proportion of vinyl polymer (polymer fine particles) in the polyoxyalkylene polyol of preferably 2 to 50% by mass, more preferably 5 to 40% by mass.

The unsaturated bond-having compound described above is a compound having an unsaturated bond in the molecule, examples thereof are acrylonitrile and styrene. These can be used singly or a plurality of the compounds can be mixed for use. Moreover, a dispersion stabilizer, a chain-transfer agent and the like can be used in combination.

<Foaming Agent>

As the foaming agent of the present invention, it is possible to use a physical foaming agent such as liquefied carbon dioxide or the like, and it is particularly preferred to use water.

When water is used as the foaming agent, water is used in an amount of preferably 0.1 to 8.0 parts by mass, more preferably 0.5 to 6.0 parts by mass based on 100 parts by mass of the polyoxyalkylene polyol and/or polymerpolyol.

<Catalyst>

As the catalyst used in the present invention, conventionally known catalysts can be used without particular limitation.

Examples of the catalyst may include an amine free from an active hydrogen atom, an amine having an active hydrogen atom and an organic tin compound.

<Polyisocyanate>

The polyisocyanate for reaction with the polyol is not particularly limited. In general, it is preferred to use toluoylene diisocyanate (although the proportion of isomers such as 2,4- or 2,6- is not particularly limited, the toluoylene diisocyanate having a proportion of 2,4-isomer to 2,6-isomer of 80/20 is preferred), and polymethylene polyphenyl polyisocyanate or its urethane modified compound, or their mixed compounds. The optimum isocyanate can be selected in accordance with necessity.

The value determined by dividing the total number of isocyanate groups in the polyisocyanate with the total number of active hydrogen, which reacts with an isocyanate group, in a hydroxyl group of the polyoxyalkylene polyol, an amino group of the crosslinking agent and the like, or water or the like, and by multiplying by 100 is taken as an NCO index. That is, in the case that the number of active hydrogen to be reacted with an isocyanate group is stoichiometrically as same as the number of isocyanate group in the polyisocyanate, the NCO index is 100. The NCO index in the present invention is preferably 50 to 150, more preferably 60 to 130.

(Other Additives)

In the present invention, other additives such as a crosslinking agent, a foam stabilizer and the like can be used without missing the object of the present invention.

<Crosslinking Agent>

For the vibration damping and sound absorbing material of the present invention, it is possible to use the crosslinking agent. In the case of using the crosslinking agent, a compound having a hydroxyl group value of 200 to 1800 mgKOH/g is preferably used as the crosslinking agent.

Examples of the crosslinking agent may include aliphatic polyhydric alcohols such as glycerin and the like; and alkanolamines such as diehtanolamine and triethanolamine.

Moreover, it is possible to use polyoxyalkylene polyol having a hydroxyl group value of 200 to 1800 mgKOH/g as the crosslinking agent, and further it is also possible to use conventionally known crosslinking agents. In the case of using such a crosslinking agent, it is preferably used in an amount of 0.5 to 10 parts by mass based on 100 parts by mass of the total amount of the polyoxyalkylene polyol and/or the polymer polyols.

<Foam Stabilizer>

It is possible to use the foam stabilizer if necessary in the present invention. There is no limitation on the foam stabilizer. Although conventionally known foam stabilizers can be used, it is usually preferred to use an organic silicon surface active agent.

For example, SRX-274C, SF-2969, SF-2961, SF-2962, SZ-3601, SZ-1325 and SZ-1328 manufactured by Toray Dow Corning Silicon Co. Ltd., and L-5309 and Y-10366 manufactured by GE Toshiba Silicon Co. Ltd., are preferably used. The foam stabilizer is used in an amount of preferably 0.1 to 10 parts by mass, more preferably 0.5 to 5 parts by mass based on 100 parts by mass of the total amount of the polyol components.

[Process for Producing the Vibration Damping and Sound Absorbing MATERIAL]

The process for producing the vibration damping and sound absorbing material formed from the polyurethane foam comprises mixing the polyol and/or the polymer dispersed polyol in which polymer fine particles prepared by polymerizing the compound having an unsaturated bond are dispersed in the polyol, with water, the catalyst and the polyisocyanate using a high pressure foaming machine or a low pressure foaming machine to prepare a mixed solution, injecting the mixed solution to a mold, reacting and expanding, and then curing and mold releasing (mold foaming method).

As the mold foaming method, it is possible to use a cold cure mold foam method and a hot cure mold foam method.

The process for producing the vibration damping and sound absorbing material by the cold cure mold foam method via the resin premix preparation step is a process such that a resin premix and polyisocyanate are mixed in a certain proportion using the high pressure foaming machine or the low pressure foaming machine to prepare a mixed solution, the mixed solution is injected into a mold previously heated at a temperature of 30 to 80° C., reacted and foamed, and then cured and mold released, and consequently an aimed product having a definite form (vibration damping and sound absorbing material) can be prepared. The resin premix is a previously mixed one obtainable by mixing the polyol and/or the polymer dispersed polyol wherein the polyol is at least a plant-derived polyol prepared using a raw material prepared from plants, with water, the catalyst, and optionally the foaming agent, the crosslinking agent and the foam stabilizer. To the resin premix, it is possible to further add a flame retardant, a pigment, a ultraviolet absorber and an oxidation inhibitor as other assistants.

In the case of using, as a catalyst, a compound having hydrolysis properties such as an organic tin catalyst, it is preferred that the water components and the organic tin catalyst components are treated in alternative systems in order to avoid the contact between them, and they are mixed in a mixing head in a foaming machine.

[Method of Measuring Vibration Damping and Sound Absorbing Material and Testing Method]

The method of measuring the vibration damping and sound absorbing materials and the testing method according to the present invention will be described below.

<All Density>

The all density ($kg/m^3$) was measured in accordance with the method as described in JIS K-6400.

<Acid Value>

The acid value (mgKOH/g) was measured in accordance with the method as described in JIS K-1557.

<Hydroxyl Group Value (OHV)>

The hydroxyl group value (mgKOH/g) was measured in accordance with the method as described in JIS K-1557.

<Hardness>

The hardness was measured using an Asker type F hardness tester (Asker Co. Ltd.).

<Gas Permeability>

The gas permeability ($cc/cm^2 \cdot sec$) was measured in accordance with the method as described in JIS K-6400. A test piece having a thickness of 20 mm and skin layers on the upper and down surfaces was prepared by cutting a specimen prepared using a mold of 400×400×20 mm and used as a sample for gas permeability measurement. The gas permeability is preferably 5 to 60 cc/cm²·sec, more preferably 10 to 40 cc/cm²·sec.

<Measurement of Sound Absorbing Coefficient>

The sound absorbing coefficient was measured by a 2 microphone method in accordance with ISO10534-2. The sound absorbing coefficient at 500 to 1000 Hz was measured by a large size tube (inner diameter 100 mm), and the sound absorbing coefficient at 2000 to 6000 Hz was measured by a small size tube (inner diameter 29 mm). Concerning the sound absorbing coefficients determined by these measurements, the sound absorbing properties are more excellent with increasing the sound absorbing coefficient. In the case that the sound is absorbed completely, the coefficient is 1.0. The vibration damping and sound absorbing material of the present invention desirably has the maximum sound absorbing coefficient of not less than 0.70, preferably not less than 0.80, more preferably not less than 0.90. The present sound absorbing material can be used favorably as a vibration damping and sound absorbing material for cars and wallboards. Particularly, the present sound absorbing material can be used most preferably for dash silencer, and interior materials such as floor mats, ceiling materials and the like concerning cars. The sound absorbing coefficient was measured using the same test piece as in the measurement of the gas permeability.

EXAMPLE

The present invention will be described with reference to the examples, but it should not be limited by the examples.

[Resin Premix]

<Plant-Derived Polyol (A)>

(A-1) Plant-Derived Polyol

As the plant-derived polyol, a plant-derived polyol (A-1) prepared by purifying castor oil squeezed from castor-oil plant was used. The hydroxyl group value was 160 mgKOH/g and the acid value was 0.3 mgKOH/g.

(A-2) Plant-Derived Polyol

To 1 mole of a derivative prepared by adding 4 moles of ethylene oxide to 1 mole of pentaerythritol, 6 moles of castor oil aliphatic acid (acid value 188 mgKOH/g) containing, as a main component, ricinoleic acid obtainable from castor oil as a hydroxycarboxylic acid having OH group and 15 or more carbon atoms was mixed, and 100 ppm of titanium lactate $[(HO)_2Ti(C_3H_5O_3)_2]$ was added as a catalyst per the total amount of them. Thereafter, condensation reaction was carried out at a temperature of from 200 to 230° C. for 30 hr. The reaction was carried out while continuously removing water generated by the condensation reaction to the outside of the system.

The plant-derived polyol (A-2) prepared by the condensation had a hydroxyl group value of 80 mgKOH/g and an acid value of 1.6 mgKOH/g.

(A-3) Plant-Derived Polyol

To 1 mole of a derivative prepared by adding 6 moles of propylene oxide to 1 mole of sorbitol, 9 moles of castor oil aliphatic acid (acid value 188 mgKOH/g) containing, as a main component, ricinoleic acid obtainable from castor oil as a hydroxycarboxylic acid having OH group and 15 or more carbon atoms (acid value 188 mgKOH/g) was mixed, and 100 ppm of titanium lactate $[(HO)_2Ti(C_3H_5O_3)_2]$ was added as a catalyst per the total amount of them. Thereafter, condensation reaction was carried out at a temperature of from 200 to 230° C. for 30 hr. The reaction was carried out while continuously removing water generated by the condensation reaction to the outside of the system.

The plant-derived polyol (A-3) prepared by condensation had a hydroxyl group value of 80 mgKOH/g and an acid value of 1.8 mgKOH/g.

(A-4) Plant-Derived Polyol

To 1 mole of a derivative prepared by adding 6 moles of propylene oxide to 1 mole of sorbitol, 14 moles of castor oil aliphatic acid (acid value 188 mgKOH/g) containing, as a main component, ricinoleic acid obtainable from castor oil as a hydroxycarboxylic acid having OH group and 15 or more carbon atoms was mixed, and 100 ppm of titanium lactate $[(HO)_2Ti(C_3H_5O_3)_2]$ was added as a catalyst per the total amount of them. Thereafter, condensation reaction was carried out at a temperature of from 200 to 230° C. for 30 hr. The reaction was carried out while continuously removing water generated by the condensation reaction to the outside of the system.

The plant-derived polyol (A-4) prepared by the condensation had a hydroxyl group value of 48 mgKOH/g and an acid value of 2.0 mgKOH/g.

<Polyol (B) Other than Plant-Derived Polyols>

(B-1) Polyoxyalkylene Polyol

To 1 mole of pentaerythritol, 0.37 mole of potassium hydroxide was added and dehydrated under reduced pressure at 100° C. for 6 hr, and then they were addition polymerized with propylene oxide at a reaction temperature of 115° C. at a maximum reaction pressure of 0.5 MPa. Thereafter, they were addition polymerized with ethylene oxide at a reaction temperature of 115° C. at a maximum reaction pressure of 0.4 MPa to prepare polyoxyalkylene polyol (B-1) having a hydroxyl group value of 28 mgKOH/g. The weight ratio of ethylene oxide was 14.5 wt %.

(B-2) Polyoxyalkylene Polyol

To 1 mole of pentaerythritol, 0.37 mole of potassium hydroxide was added and dehydrated under reduced pressure at 100° C. for 6 hr, and then they were addition polymerized with propylene oxide at a reaction temperature of 115° C. at a maximum reaction pressure of 0.5 MPa. Thereafter, they were addition polymerized with ethylene oxide at a reaction temperature of 115° C. at a maximum reaction pressure of 0.4 MPa to prepare polyoxyalkylene polyol (B-2) having a hydroxyl group value of 43 mgKOH/g. The weight ratio of ethylene oxide was 14.5 wt %.

(B-3) Polymer Dispersed Polyol

To glycerin, propylene oxide and ethylene oxide were added by the same synthesis method as (B-1), and thereby polyoxyalkylene polyol having an amount of ethylene oxide present at the end of 14.5 wt % and a hydroxyl group value of 33 mgKOH/g was prepared. Thereafter, acrylonitrile was graft polymerized in the resultant polyoxyalkylene polyol in the presence of a radical initiator at 120° C. and thereby polymer dispersed polyol (B-3) having a hydroxyl group value of 28 mgKOH/g and a vinyl polymer content of 20 wt % was prepared.

(B-4) Polymer Dispersed Polyol

To glycerin, propylene oxide and ethylene oxide were added by the same synthesis method as (B-1), and thereby polyoxyalkylene polyol having an amount of ethylene oxide present at the end of 14.5 wt % and a hydroxyl group value of 33 mgKOH/g was prepared. Thereafter, acrylonitrile and styrene were graft polymerized in the resultant polyoxyalkylene polyol in the presence of a radical initiator at 120° C. and thereby polymer dispersed polyol (B-4) having a hydroxyl group value of 28 mgKOH/g and a vinyl polymer content of 20 wt % was prepared. The weight ratio of acrylonitrile to styrene was 80/20.

<Isocyanate Compound (C)>
(C-1) Isocyanate Compound

As the isocyanate compound (C-1), Cosmonate TM-20 (manufactured by Mitsui Chemicals Polyurethanes, Inc.) was used. It is a mixture that comprises 80 parts of a mixture of 2,4-tolylene diisocyanate and 2,6-tolylene diisocyanate in a mass ratio of 80:20, and 20 parts of polymethylene polyphenylene polyisocyanate.

<Catalyst>

As the catalyst (Catalyst 1), Minico L-1020 (33% diethylene glycol solution of triethylene diamine) (manufactured by Katsuzai Chemicals Co.) was used.

<Other Additives>

Crosslinking agent: purified glycerin
Foam stabilizer 1: SF-2971 (manufactured by Tory Dow Corning Silicon Co.)
Foam stabilizer 2: Y-10366 (manufactured by GE Toshiba Silicon Co.)

Examples 1-12

In each example, the blend of the resin premix prepared by mixing the above components, and the NCO index are shown in Table 1. In the table 1, the numbers concerning the blend mean parts.

To the resin premix, a certain amount of an isocyanate compound was injected into a mold having an inner size of 400 mm×400 mm×20 mm previously heated at 65° C. and the mold was closed and thereby they were cured for 4 min to prepare a vibration damping and sound absorbing material.

Various kinds of evaluations of the resulting vibration damping and sound absorbing material (Examples 1 to 12) are shown in Table 1.

TABLE 1

| | Example | | | | | |
|---|---|---|---|---|---|---|
| | 1 | 2 | 3 | 4 | 5 | 6 |
| A-1 | 23 | 30 | 46 | | | |
| A-2 | | | | 45 | | |
| A-3 | | | | | 30 | |
| A-4 | | | | | | 22 |
| B-1 | 57 | 50 | 34 | 35 | 50 | 58 |
| B-2 | | | | | | |
| B-3 | 20 | 20 | 20 | 20 | 20 | 20 |
| B-4 | | | | | | |
| Water | 4.6 | 4.6 | 4.6 | 4.6 | 4.6 | 4.6 |
| Crosslinking agent | | | | | | |
| Catalyst 1 | 1.3 | 1.3 | 1.3 | 1.3 | 1.3 | 1.3 |
| Foam stabilizer 1 | | | | | | |
| Foam stabilizer 2 | 1 | 1 | 1 | 1 | 1 | 1 |
| NCO index | 70 | 70 | 70 | 70 | 70 | 70 |
| C-1 | 40.6 | 41.7 | 44.3 | 39.7 | 38.8 | 37.6 |
| Content of Plant-derived components (%) | 15.6 | 20.2 | 30.4 | 30.7 | 20.6 | 15.2 |
| All density (kg/m$^3$) | 44.7 | 44.7 | 45.0 | 44.4 | 44.7 | 45.0 |
| Hardness (type F) | 26 | 29 | 37 | 35 | 36 | 42 |
| Gas permeability (cc/cm$^2$ · sec) | 28 | 20 | 30 | 28 | 25 | 5 |
| Maximum sound absorbing coefficient | 0.97 | 0.97 | 0.91 | 0.94 | 0.97 | 0.74 |

| | Example | | | | | |
|---|---|---|---|---|---|---|
| | 7 | 8 | 9 | 10 | 11 | 12 |
| A-1 | 22 | 29 | 44 | | | |
| A-2 | | | | 42 | | |
| A-3 | | | | | 42 | |
| A-4 | | | | | | 21 |
| B-1 | | | | | | |
| B-2 | 38 | 31 | 16 | 18 | 18 | 39 |
| B-3 | | | | | | |
| B-4 | 40 | 40 | 40 | 40 | 40 | 40 |
| Water | 1.8 | 1.8 | 1.8 | 1.8 | 1.8 | 1.8 |
| Crosslinking agent | 1.3 | 1.3 | 1.3 | 1.3 | 1.3 | 1.3 |
| Catalyst 1 | 1.9 | 1.9 | 1.9 | 1.9 | 1.9 | 1.9 |
| Foam stabilizer 1 | 1 | 1 | 1 | 1 | 1 | 1 |
| Foam stabilizer 2 | | | | | | |
| NCO index | 105 | 105 | 105 | 105 | 105 | 105 |
| C-1 | 34.7 | 36.2 | 39.3 | 32.8 | 32.8 | 30.3 |
| Content of Plant-derived components (%) | 15.6 | 20.4 | 30.3 | 30.3 | 30.3 | 15.4 |
| All density (kg/m$^3$) | 100.6 | 101.3 | 100.9 | 100.3 | 100.0 | 101.3 |
| Hardness (type F) | 82 | 85 | 87 | 82 | 83 | 83 |
| Gas permeability (cc/cm$^2$ · sec) | 14 | 18 | 23 | 18 | 8 | 6 |

TABLE 1-continued

| Maximum sound absorbing coefficient | 0.96 | 0.98 | 0.97 | 0.96 | 0.81 | 0.75 |

POSSIBILITY OF INDUSTRIAL USE

The vibration damping and sound absorbing material containing a plant-derived polyol of the present invention largely contributes a decrease of environmental load, and has excellent sound absorbing properties. Specifically, the vibration damping and sound absorbing material containing the plant-derived polyol of the present invention can be suitably used for cars and wallboards, particularly for car vibration damping and sound absorbing materials. Moreover, the vibration damping and sound absorbing material can be combined with a surface material having a high specific gravity (vinyl chloride resin, olefin resin or the like) and used in a two layered structure or multi-layered structure.

The invention claimed is:

1. A vibration damping and sound absorbing material comprising a polyurethane foam which comprises, as raw materials, a polyol, water, a catalyst and a polyisocyanate,
wherein the polyol comprises:
(A) a plant-derived polyol having a hydroxyl group value of from 65 to 170 mgKOH/g,
a polyoxyalkylene polyol having a hydroxyl group value of from 15 to 60 mgKOH/g, and
a polymer-dispersed polyol in which polymer fine particles obtained by polymerizing an unsaturated bond-containing compound are dispersed in a polyol,
wherein the plant-derived polyol (A) comprises at least one plant-derived polyol selected from the group consisting of:
(A4) a plant-derived polyester polyol at least having a structure such that a hydroxycarboxylic acid, which comprises a castor oil aliphatic acid containing, as a main component, recinoleic acid obtained from castor oil and/or a hydrogenated castor oil aliphatic acid containing, as a main component, 12-hydroxystearic acid obtained by saturating carbon-carbon double bond in the castor oil aliphatic acid, is condensed in a polyhydric alcohol having 2 to 6 hydroxyl groups in one molecule,
(A5) a polyol obtained by, further, adding lactone to the plant-derived polyester polyol (A4), and
(A6) a polyol obtained by, further, adding a hydroxy carboxylic acid having a primary hydroxyl group to the plant-derived polyester polyol (A4),
wherein a test piece having a thickness of 20 mm obtained by the vibration damping and sound absorbing material has a maximum sound absorbing coefficient, as measured in accordance with a 2 microphone method by ISO10534-2, of from 0.80 to 1.0.

2. The vibration damping and sound absorbing material according to claim 1 wherein the vibration damping and sound absorbing material is used for cars.

3. A process for producing a vibration damping and sound absorbing material comprising a polyurethane foam, which process comprises:
injecting a mixed solution which comprises a polyol, water, a catalyst and a polyisocyanate, into a mold,
reacting and expanding,
curing and releasing from the mold,
wherein the polyol comprises:
(A) a plant-derived polyol having a hydroxyl group value of from 65 to 170 mgKOH/g,
a polyoxyalkylene polyol having a hydroxyl group value of from 15 to 60 mgKOH/g, and
a polymer-dispersed polyol in which polymer fine particles obtained by polymerizing an unsaturated bond-containing compound are dispersed in a polyol,
wherein the plant-derived polyol (A) comprises at least one plant-derived polyol selected from the group consisting of:
(A4) a plant-derived polyester polyol at least having a structure such that a hydroxycarboxylic acid, which comprises a castor oil aliphatic acid containing, as a main component, recinoleic acid obtained from castor oil and/or a hydrogenated castor oil aliphatic acid containing, as a main component, 12-hydroxystearic acid obtained by saturating carbon-carbon double bond in the castor oil aliphatic acid, is condensed in a polyhydric alcohol having 2 to 6 hydroxyl groups in one molecule,
(A5) a polyol obtained by, further, adding lactone to the plant-derived polyester polyol (A4), and
(A6) a polyol obtained by, further, adding a hydroxy carboxylic acid having a primary hydroxyl group to the plant-derived polyester polyol (A4),
wherein a test piece having a thickness of 20 mm obtained by the vibration damping and sound absorbing material has a maximum sound absorbing coefficient, as measured in accordance with a 2 microphone method by ISO10534-2, of from 0.80 to 1.0.

4. The process for producing a vibration damping and sound absorbing material according to claim 3, wherein the mixed solution is prepared by:
[1] preparing a resin premix by mixing the polyol, water and a catalyst, and
[2] mixing the resin premix prepared in the step [1] with a polyisocyanate.

* * * * *